Jan. 2, 1923.
O. KRENKE.
HOSE REEL.
FILED OCT. 3, 1921.
1,441,157.
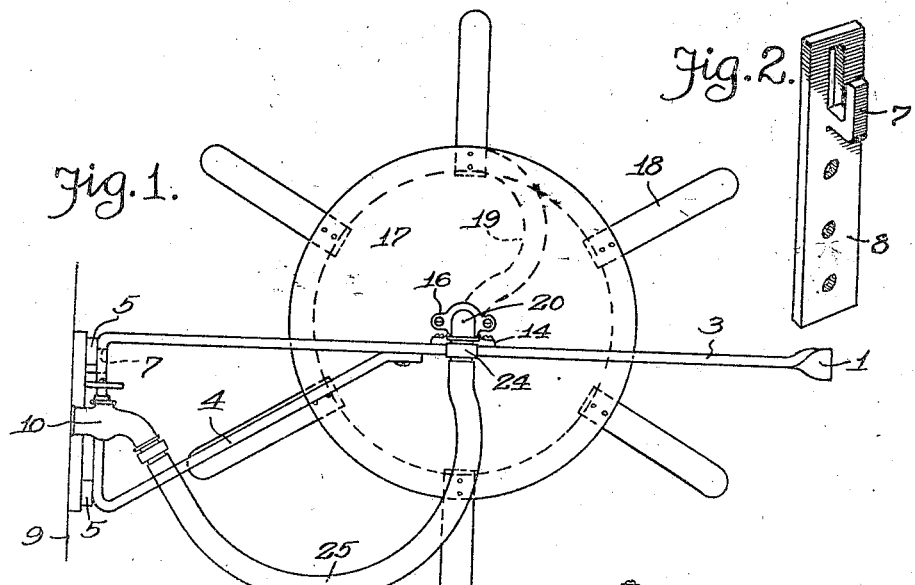
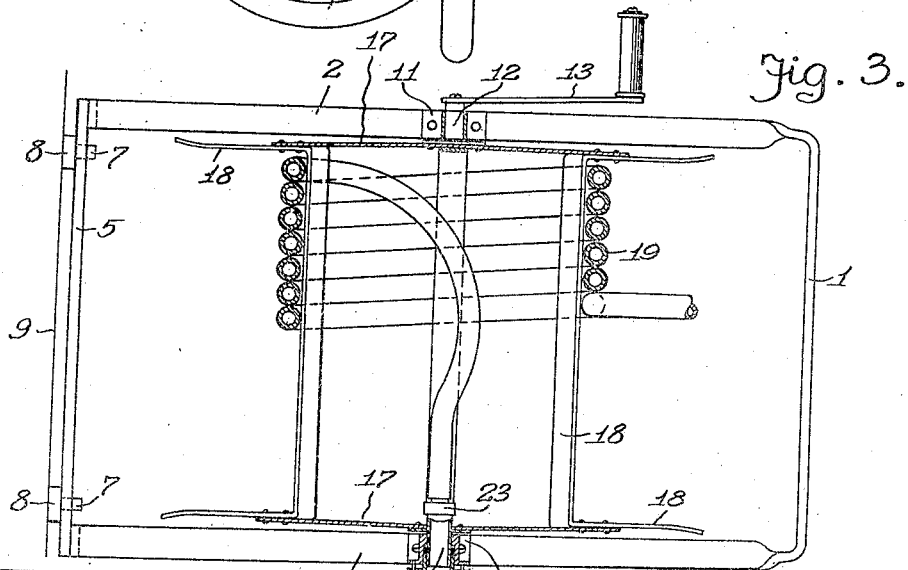
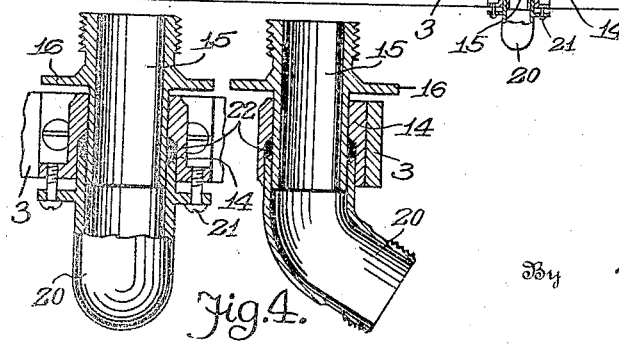
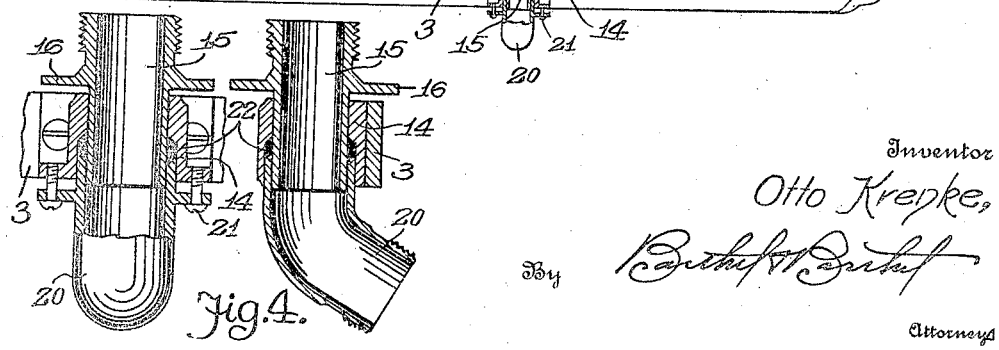
Inventor
Otto Krenke,
By
Attorneys Patented Jan. 2, 1923.

1,441,157

UNITED STATES PATENT OFFICE.

OTTO KRENKE, OF PORT HURON, MICHIGAN.

HOSE REEL.

Application filed October 3, 1921. Serial No. 504,963.

*To all whom it may concern:*

Be it known that I, OTTO KRENKE, a citizen of the United States of America, residing at Port Huron, in the county of St. Clair and State of Michigan, have invented certain new and useful Improvements in Hose Reels, of which the following is a specification, reference being had therein to the accompanying drawings.

This invention relates to a hose reel and my invention aims to provide a portable reel that may be easily carried from one place to another and mounted adjacent to a faucet so that the hose on the reel may be easily and quickly connected to the faucet to receive water therefrom, and the reel is supported so that a desired length of hose may be withdrawn from the reel for watering purposes.

My invention further aims to provide a hose reel made of structural steel or other metal which is comparatively light and easy to assemble, the reel embodying an axial connection by which a hose convolution may be easily connected to a faucet or water supply device and permit of other portions of the hose being used.

The construction entering into my invention will be hereinafter described and then claimed, and reference will now be had to the drawing wherein Figure 1 is a side elevation of the hose reel;

Fig. 2 is a perspective view of one of the wall brackets adapted for supporting the hose reel;

Fig. 3 is a plan of the hose reel partly broken away and partly in section, and

Fig. 4 shows detail sectional views of stuffing boxes or axial connections for the hose reel.

In the drawing the reference numeral 1 denotes a bail having parallel flat arms 2 and 3 with the ends thereof bent to provide feet or brackets 4 which are connected by transverse bars 5 disposed in parallelism and also parallel to the outer end of the bail 1, which serves as a handle for carrying the hose reel. The arms 2 and 3 may be easily bent to form the triangular shaped feet 4 and with these feet connected by the bars 5 there will be a substantial base for the hose reel when the bail 1 is in a vertical position on the ground.

The upper most bar 5 is adapted to be placed behind the hook-shaped member 7 of wall brackets 8, there being two such brackets in spaced relation attached to a wall 9 adjacent a faucet 10. With the wall brackets 8 firmly attached to the wall 9 the bars 5 may rest against said brackets and be suspended from the hook shaped members 7, with the arms 2 and 3 of the bail extending outwardly in a horizontal plane at a right angle to the wall 9, as shown in Fig. 1.

On the arm 2 is a bearing 11 for a solid pintle member 12 which has its outer end provided with a suitable crank or handle 13 so that the pintle may be rotated.

On the arm 3 in alignment with the bearing 11 is a bearing or stuffing box 14 for a tubular or hollow pintle 15. The pintles 12 and 15 have peripheral flanges 16 riveted or otherwise connected to dished metallic heads 17 which are preferably circular in elevation. The heads 17 are necessarily in spaced relation and the peripheral edges of said heads are connected by U-shaped hose supporting arms 18 equally spaced between and about said heads. The arms 18 afford transverse supporting members about which a hose 19 may be wound and the ends of said arms project outwardly from the peripheral edges of the heads 17 and permit of a large amount of hose being stored on the reel, without any danger of the convolutions of the hose becoming accidentally displaced.

The bearing or stuffing box 14 which receives the tubular pintle 15 has an elbow gland 20 connected to the stuffing box 14 by screws 21 or other fastening means, and the pintle 15 extends into the gland with a suitable packing 22 held about the pintle within the stuffing box by the gland. The pintle therefore turns in the gland as well as in the stuffing box, consequently there is a long bearing for this particular pintle which may be thoroughly packed to prevent leakage at this axial connection of the reel.

The inner end of the hollow pintle 15 is connected to an inner or end convolution of the hose 19 by a coupling member 23, and the outer end of the elbow gland 20 is connected by a coupling member 24 to a short section of hose 25, said hose being suitably coupled to the faucet 10, so that there will be a supply of water to the hose 19 when the faucet 10 is turned on.

With the hose reel in the position shown in Fig. 1, the hose is ready to be used and a desired length may be withdrawn from the reel for watering purposes and after using the hose it may be re-wound on the reel by turning the crank 13. Since the reel is elevated the hose will drain as it is wound on the reel, and the reel may remain in engagement with the brackets 8 and coupled to the faucet 10 for future use, or it may be removed from the brackets, disconnected at the faucet or the coupling member 24, and used at other places.

From the foregoing it will be observed that the hose reel can be made of malleable metal bent to shape and easily assembled. The heads 17 of the reel may be of sheet metal, and other fittings or pieces of hardware made of brass, especially those parts receiving wear. The reel in its entirety will be finished so as not to corrode, and while in the drawing there is illustrated a preferred embodiment of my invention, it is to be understood that the structural elements are susceptible to such changes in size, shape and manner of assemblage as fall within the scope of the appended claims.

Having thus fully described my invention, what I claim is:—

1. A hose reel comprising a bail of a configuration adapted for either attachment to a wall in a horizontal position or to rest on the ground in a vertical position, pintles supported by said bail with one of said pintles hollow and adapted to communicate with a faucet, heads carried by said pintles, and arms solely connecting said heads and extending radially therefrom and adapted to support convolutions of a hose of greater diameter than said heads with one end of the hose connected to the hollow pintle.

2. The combination with a hose reel, of a bail made of a single piece of material bent to provide parallel bars having triangular bracket-shaped ends adapted to be supported from a wall adjacent a faucet, and pintles supporting said hose reel in said bail with one of said pintles hollow for communication with the faucet and an end of the hose on the reel.

3. The combination set forth in claim 2 and bars connecting the bracket ends of said bail and contributing to the suspension of said bail from a wall.

In testimony whereof I affix my signature in presence of two witnesses.

OTTO KRENKE.

Witnesses:
WM. E. KRENKE,
FRED M. HITCHENS.